Patented Nov. 21, 1922.

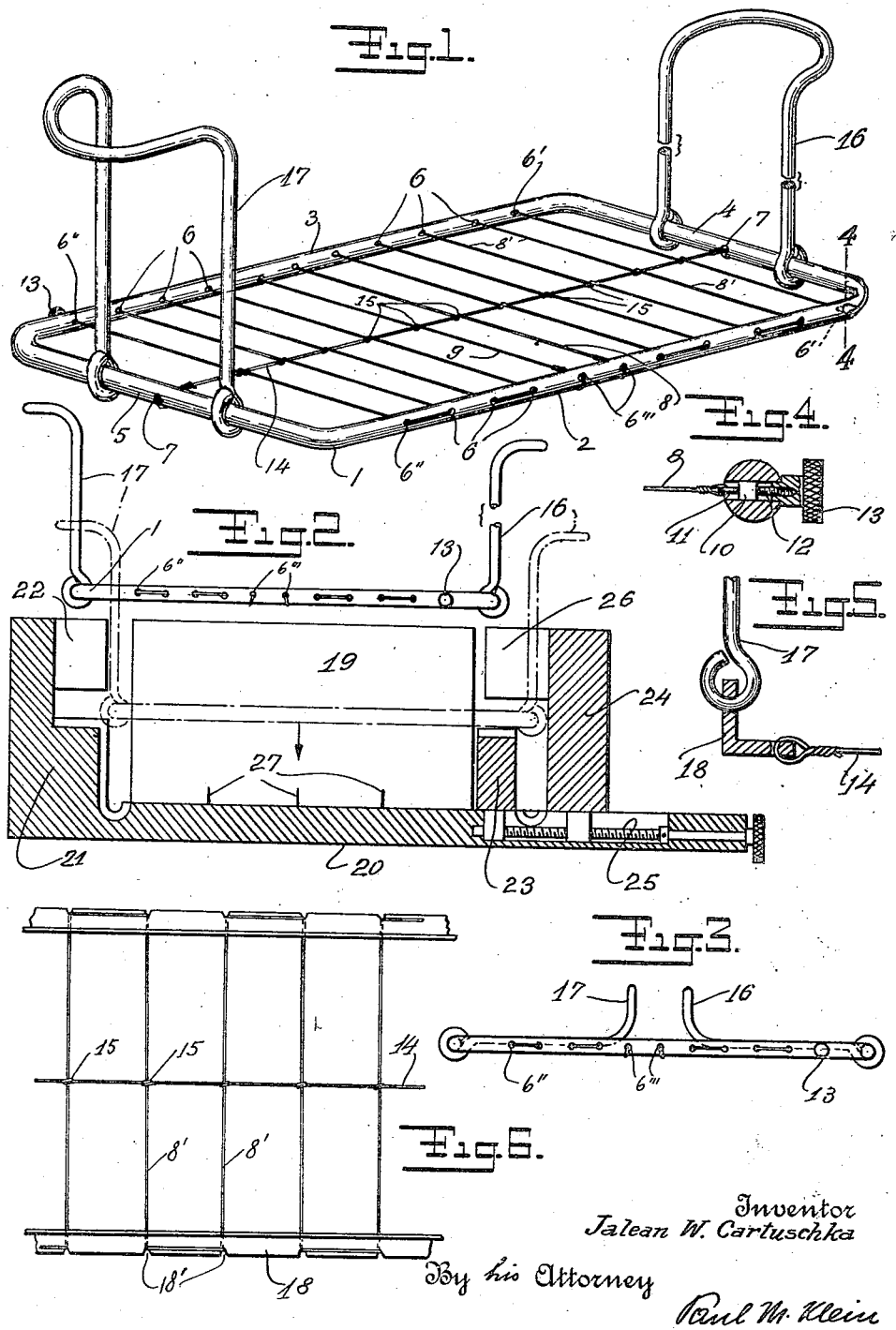

1,436,236

UNITED STATES PATENT OFFICE.

JALEAN W. CARTUSCHKA, OF NEW YORK, N. Y.

BUTTER CUTTER.

Application filed December 1, 1920. Serial No. 427,586.

*To all whom it may concern:*

Be it known that I, JALEAN W. CARTUSCHKA, a citizen of the United States, and resident of New York, in the county of New York and State of New York, have invented certain new and useful Improvements in Butter Cutters, of which the following is a specification.

This invention relates to butter cutters, and its primary objects are to provide a simple, inexpensive and effective butter cutting device for cutting a cake or block of butter at one continuous operation into two or more rows of squares.

Another object of my invention is to provide a collapsible cutter so that it may be folded in a convenient manner for the purpose of storing or shipping.

Another object of my invention is to provide in such a cutter adjusting means whereby the cutting members may be effectively tightened.

A further object of my invention is to provide in combination with such a cutter a butter supporting member having rigid and adjustable means for facilitating the successive guiding of the cutter in downward, sideward and downward directions to the base of said member.

A still further object is to provide upon the base of such butter supporting members transversely disposed butter engaging means for preventing the cake of butter from moving while being cut.

The foregoing and still other objects will be more fully apparent from the following description and the accompanying drawings, forming part of this specification, in which:

Figure 1 is a perspective view of my cutter.

Figure 2 illustrates my cutter in combination with a preferred form of a butter supporting member, the latter in section.

Figure 3 is a side view of the collapsed cutter.

Figure 4 illustrates a preferred form of a wire tightening device.

Figure 5 illustrates a detail sectional view through a modified form of a cutter frame.

Figure 6 is a partial top view of a modified cutter.

Referring to the drawings, 1 designates the cutter frame which is made preferably of heavy wire rod or any other suitable material. The frame is of rectangular shape with side legs 2 and 3 and frame ends or end legs 4 and 5.

At the side legs is provided a plurality of apertures 6 facing each other and so disposed that the distance between frame end 4 and the end aperture 6′ nearest thereto is approximately half of the distance between frame end 5 and the opposite end apertures 6″.

The frame ends possess central apertures 7 similar to that of the side legs.

Fastened at substantially the center of the side legs preferably at the center apertures 6‴ is a pair of cutting members 8 and 9 made of either wire, twine, hair or other suitable material. They are strung from their fastening point successively through apertures 6 toward their respective frame ends and terminate at one of the end apertures 6′ and 6″ respectively. In these end apertures slide fastening blocks 10 (Fig. 4) provided at one end with loops 11 to which are attached the free ends of the cutting members 8 and 9. These blocks form in substance heads of screws 12 engaged by thumb-knobbed units 13 by means of which the wires may be stretched or tightened.

The cutting members passing through the registering apertures are strung in parallel relation to each other and transversely to the frame.

Strung from one frame end to the other and fastened at apertures 7 is a central cutting member 14 engaging each of the parallel wires individually by forming loops around them as indicated at 15.

Hingedly attached at the frame ends are handles 16 and 17 so arranged as to facilitate their folding or swinging toward each other in the manner shown in Figure 3. They may be made of wire rod or any other suitable stock.

As has been said before, the frame may be made not only of heavy wire rod, but of any desirable material. In Figs. 5 and 6 the frame is shown to be made of angle shaped stock 18 and instead of apertures 6 notches 18′ are provided for engaging cutting member 8′.

In this arrangement only one wire is used and its attached portions pass below the frame, then through the notches and over the outer flanged part thereof, through the next notch and again below the frame and so on until its free ends terminate in end apertures (not shown) similar to that indicated at 6' and 6'' in Fig. 1 where tightening means are provided.

For properly supporting and holding a block or cake of butter indicated at 19 in Figure 2, a butter support is provided comprising a base portion 20 with which is associated a stationary step-formed standard 21 having a pair of inward extensions, one of which is indicated at 22, forming a space between for receiving and guiding handle 17 of cutter. Opposite the stationary standard are two movable blocks 23 and 24 adjustable by means of threaded spindle 25. Block 23 is of about half the height of block 24 and its width corresponds to the width of a field formed by frame end 4 and the last transverse wire portion of the cutter nearest to that frame end.

Through the longitudinal adjusting arrangement of blocks 23 and 24 the space between the latter and standard 21 may be made to fit the length of the butter block. At the upper portion of block 24 guide projections 26 are provided forming a guard for handle 16 for the cutter. Block 23 is split at its center (not shown) for permitting central wire 14 to pass through.

For preventing the cake of butter laid upon base 20 from moving, upwardly projecting and transversely disposed blade-like butter engaging means 27 are associated with the base and are provided with a central slot not shown to accommodate wire 14 when the cutter is brought upon the base.

In operation the cutter is first set with handle 17 against the reduced portion of standard 21 and forced down through the cake of butter until the frame reaches the broadened portion of standard 21 and the upper portion of block 23. In this manner the upper half of the cake of butter is cut into a plurality of cubes. Now the cutter is pushed horizontally to the right being guided by the upper faces of the offset portion of the standard 21 and the block 23 until handle 16 abuts with block 24, as shown in broken lines in Fig. 2. By this operation the cubes are severed from the lower uncut portion of the cake of butter.

Now the cutter is pushed down again in vertical direction, being guided between the inner faces of the broadened portion of standard 21 and block 24. In this manner the lower portion of the cake 19 is cut into cubes. It will be observed that the frame passes over split block 23 which serves as an additional guide.

From the drawings it will be evident that the wires strung transversely between the long sides of the frame form rectangular divisions of equal width except the one formed between the short end 5 of the frame and the first cross wire. The width of this division is twice as large as the width of the remaining divisions. This arrangement facilitates a step-like mode of operation of my device, whereby the first wire next to frame end 5 does not cut the butter cake during the first operation in vertical direction. However it cuts it during the second vertical downward operation. Correspondingly the wire next to frame end 4 will cut in the first downward operation, while it will not cut in the second downward operation.

Having thus described my device and its working method, I reserve for myself the right to make changes or improvements within the broad scope of my invention to meet various conditions.

I claim:

1. In a butter cutting device, a butter cake support, comprising a stationary and a movable member, guide means provided in said support for guiding a cutter to travel successively in vertical downward direction, transversely, and again in downward direction.

2. In a butter cutting device, an adjustable butter cake support, guide means provided with said support for causing a cutter to successively travel in vertical downward, transverse and again in downward directions.

3. In a butter cutting device having an adjustable butter cake support, provided with cutter guides, a cutter comprising an endless frame having collapsible handles, a longitudinal and a plurality of transverse cutting elements associated with said frame, said cutter adapted to be guided within said support, to successively travel in vertcial downward, transverse and again in downward directions.

4. In a butter cutting device having an adjustable butter cake support, provided with cutter guides, a cutter comprising a frame having a pair of collapsible handles, a longitudinal centrally disposed cutting element provided within the frame, a plurality of transverse cutting elements also associated with said frame and crossing the said longitudinal element, means for adjusting said elements, said cutter adapted to follow the guides of said support, thus traveling successively first in vertical downward, transverse, and again in downward directions, thereby cutting first the upper half of a cake of butter into cubes, then cutting the cake at substantially its center portion, thus separating the cubes from the uncut cake portion, and finally cutting the uncut cake portion into cubes.

5. A hand butter cutter adapted to be operated within and be guided by a butter cake support, comprising in combination a rectangular frame provided with swingable handles at the short sides, a plurality of cutting wire attaching means provided at the long sides of said frame, a wire strung between said attaching means and so arranged as to form with said frame a plurality of rectangular divisions of equal width, and one end division of greater width, wire attaching means at the short sides of said frame, a wire strung therebetween and dividing said rectangular division in half, and means for tightening said wire.

6. A hand butter cutter adapted to be operated and guided within an adjustable butter cake support, comprising an endless, rectangular frame having swingable handles at its short sides, wire receiving means provided at the side legs of the frame and arranged opposite each other, two of the opposite disposed end receiving means being nearer to their corresponding frame end than the other end receiving means to their frame end, a central wire strung between the frame ends, a plurality of wires strung between the receiving means of the frame side legs and tightening means at each free end of said wires.

7. A hand butter cutter, comprising in combination a rigid frame, a pair of swingable handles attached at the frame ends, a plurality of wire attaching means provided at the side legs of the frame, similar attaching means at the end legs of the frame, a pair of wires fixedly attached at substantially the center of the side legs and strung transversely in the frame and between said wire attaching means, individual wire tightening means provided at the free wire ends and bearing against the frame, a central wire strung longitudinally between and attached within said frame end receiving means and engaging each wire portion of the transversely strung wires.

Signed at New York, in the county of New York, and State of New York, this 21st day of November, A. D. 1920.

JALEAN W. CARTUSCHKA.